Sept. 10, 1940.  W. J. GRIBBIN  2,214,528
AUTOMATIC OILING MECHANISM
Filed July 9, 1938  2 Sheets-Sheet 1
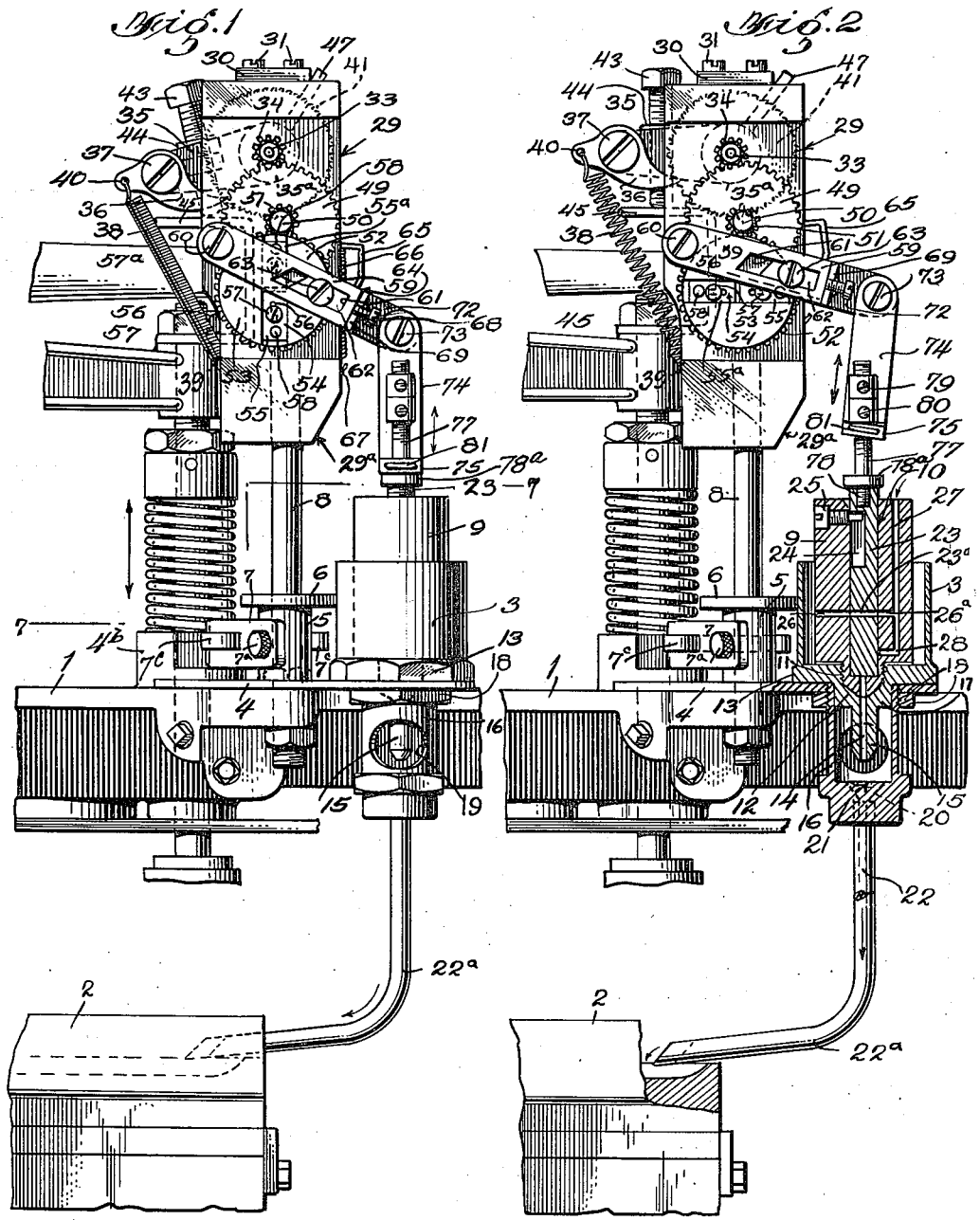
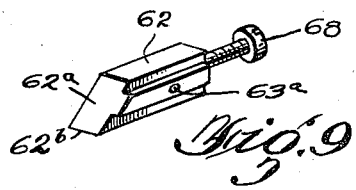
Inventor
Wm J. Gribbin
By
Lowe & Lowe
Attorneys.

Sept. 10, 1940.    W. J. GRIBBIN    2,214,528
AUTOMATIC OILING MECHANISM
Filed July 9, 1938    2 Sheets-Sheet 2
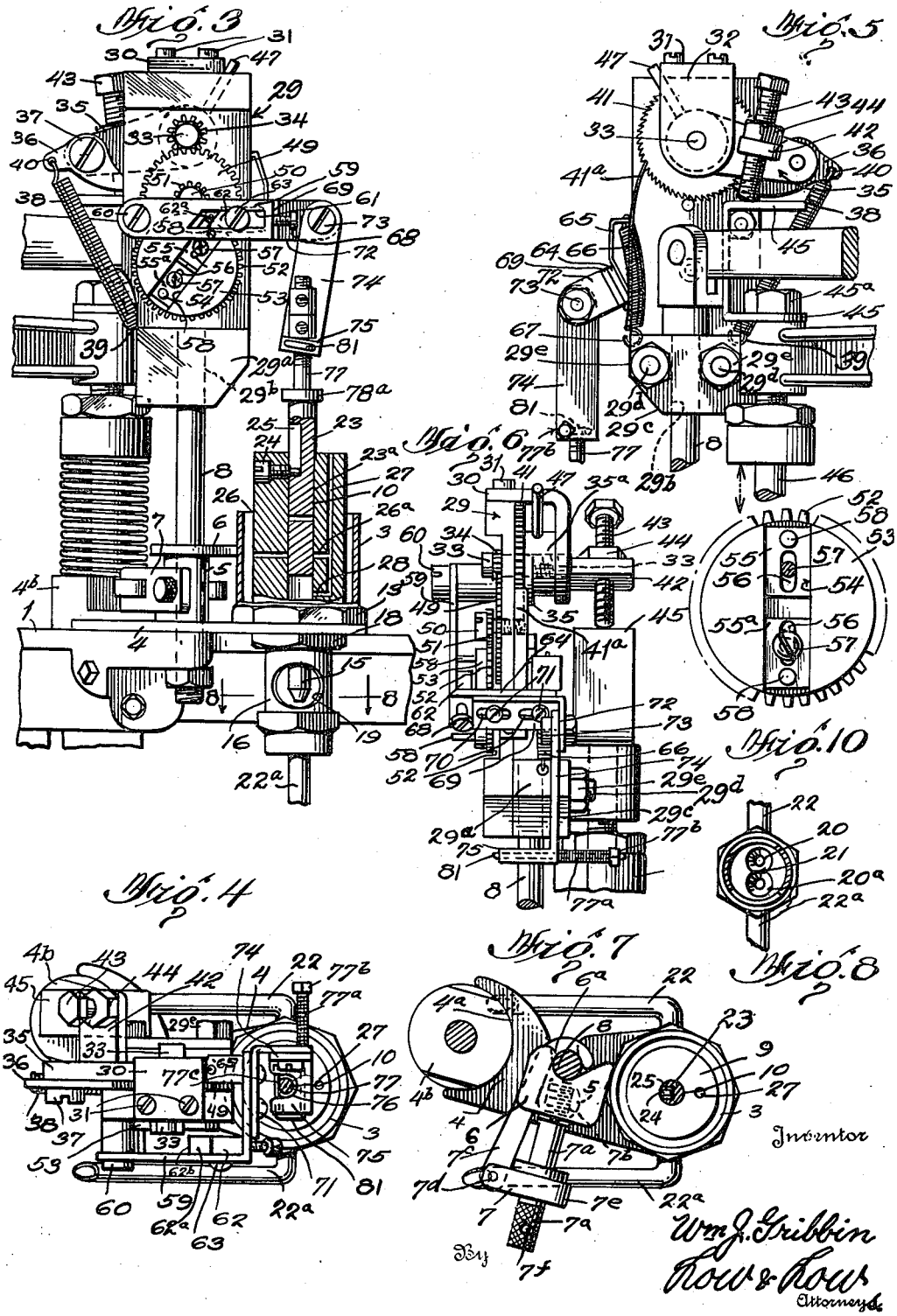

Patented Sept. 10, 1940

2,214,528

UNITED STATES PATENT OFFICE 2,214,528

AUTOMATIC OILING MECHANISM

William J. Gribbin, Silver Spring, Md.

Application July 9, 1938, Serial No. 218,462

5 Claims. (Cl. 184—27)

The invention relates to automatic oiling mechanism and has for its objects to provide improved devices of this character which may be installed on various types of machines wherein automatic lubrication at predetermined intervals is desirable without necessitating manual attention.

An important object of the invention is to provide automatic oiling mechanism which is conveniently adjustable to supply predetermined amounts of lubrication at desired intervals, provision being made to increase or decrease the time interval or amount of lubrication supplied or both, depending upon the type of machine in which the mechanism is installed.

A further object of the invention is to provide automatic oiling or lubricating mechanism of the character described wherein the lubricant is delivered to the desired locality or localities under a pressure or force feed at predetermined intervals, which latter may be varied by convenient adjustment to which the mechanism is readily susceptible.

A still further object is to provide a mechanism of the character described which may be readily installed upon various types of machines, which mechanism is designed to automatically shut down the supply of lubricant when the machine is at rest and which automatically reestablishes the constant feed of lubricant at the desired interval and in regular or constant amount when the machine is started up or placed in operation after a period of shut down or rest.

A further object is to insure against the admission of sediment from the oil reservoir or other source of supply into the lubricating lines, this being due to the principle of operation as well as the design of the mechanism.

A still further object is to provide a lubricating mechanism of the character described which may be conveniently adapted for any machine requiring a predetermined quantity of oil at given or timed intervals determined by the number and speed of revolution of the driving parts.

A further object is to provide an automatic oiling mechanism wherein the wick or capillary type of oiling mechanism is entirely eliminated. Such objectionable types of lubricating mechanisms heretofore employed in various machines supply the same amount of oil regardless of the speed of operation of the machine. This is objectionable for the reason that at high speeds the parts may be insufficiently lubricated where- as at slow speed the amount of lubricant is usually in excess of that required.

A still further object is to provide an oiling or lubricating mechanism of the character described which is designed to be installed as a part of any oiling system wherein the lubricant is supplied from an oil cup or reservoir by gravity, pressure or other types of feed, the invention being further characterized by virtue of its design to insure the supply of lubricant without interruption at any time as long as a quantity of lubricant is maintained in the oil cup or other equivalent reservoir in connection with which the present improvements are designed to cooperate for the purposes specified. The principle of operation is such that the mechanism cannot fail to operate due to oil being trapped in the feed lines nor can the lubricant fail to reach the locality where it is forcibly ejected into the feed pipes leading to the parts to be lubricated, said force feed being in turn controlled by readily variable gearing in turn operated from any convenient revolving or reciprocating part of the machine.

While adaptable for various types of machines, the instant automatic oiling mechanism has been found to be particularly desirable in Monotype type casting machines, wherein previous mechanisms known in this art have been found inferior and incapable of adequately lubricating the mold for casting the type from the usual molten type metal.

The mold of a Monotype composing machine, due to the fact that it is used with molten metal at a temperature of from 650 to 850 degrees, is of necessity in the manufacture of type, a delicate piece of mechanism that can have no allowance for space between moving or relatively movable parts without adversely affecting the character of type being cast. Type must be 100% perfect or it cannot be used. The problem of maintaining a piece of mechanism of this character oiled properly has been extremely difficult to solve properly and has necessitated frequent delays and expensive repairs. Lack of uniform oiling on a composing machine mold results in many complications and wears the mold more than twice as rapidly as when properly and uniformly oiled. First and foremost is the cutting of the faces of the type blocks and cross block.

When a cross block becomes cut, through lack of sufficient oil, several things happen: (1) It allows fins to be cast on type, making it unusable, (2), it forces itself away from the type blocks and permits what is known in the art as "leading." That is, it allows the metal to adhere to the face of the cross block due to the fact that it does not clean itself as it should and does when it is closely fitted, as it must be, to the type block, and (3) this leading can become so pronounced that it will jam the machine and in some instances break the type carrier cam lever. When these conditions prevail as they have in the past, it has necessitated removing the mold from the machine to be sent to the factory for repairs, with consequent loss of time and increased expense, for no Monotype operator has either the facilities or the experience to grind out the cuts or scorings in the cross or type blocks and lap them again to their proper bearing, which must be 100% perfect.

A further objectionable condition frequently occurring in hundreds of plants, is what in the art is termed "mold blade hanging up." This is also a condition brought about by improper oiling and is caused by the moving parts of the mold blade becoming dry, with the result that the metal that is forced into the opening adheres to the mold blade or type blocks, and within a short time a "leaded-up" mold blade occurs, which either will not pull back far enough to give the proper body size or it may be just the opposite and having made the type will not eject it. This condition can be corrected temporarily by the operator by removing the mold from the machine with consequent objectionable delay, and taking the mold apart and cleaning it, but unless properly and uniformly oiled the same condition will be repeated until the mold blade wears to a point where it has to be returned to the factory for replacement. This practice usually entails a rebuilding of the mold at a cost ranging between $35.00 and $60.00. A further objectionable result of the mold blade "leading up" is that, if it hangs up on the sizing pull it can and does occasionally break the mold blade.

In addition the lack of proper lubrication of a composition mold causes what is termed "raised mold blade." In the low quad type style of mold this can happen either by metal collecting upon the lower mold blade and mold base or metal collecting between the lower and upper mold blade. This condition can be corrected by the operator but unless strict attention is paid to the oiling of the mold, it will re-occur again and again until it wears the mold blades to a point where it is necessary to send the mold to the factory for repairs, at a cost usually as heavy as that indicated above. In addition every time the operator has to correct this condition he must remove the mold from the machine, take the mold apart, clean it and re-assemble and replace it on the machine; on an average this takes 45 minutes and involves a considerable loss of production. Lack of proper oiling of a composition mold also causes the cross block gate pusher to lead and hang-up. It also causes wear between the mold base and the cross block gate pusher blocks. This again requires the mold going to the factory for repair or rebuilding.

The proper and uniform oiling of the mold materially aids in delaying the wear of the matrix seats of the mold; that is to say at the point where the matrix is seated on the mold by a downward stroke each time there is a revolution of the machine, whether a type is being made or not. While adequate and uniform supply of lubricant will not prevent this wear entirely, it will lengthen the life of this part of the type casting machine by as much as 50%. Proper oiling of the mold will prevent cross block cuts and jams entirely; it will eliminate at least 75% of the mold blade hang-ups and mold blade raising. It will prevent about 90% of the cross block gate pusher hang-ups and will prevent the wear of the mold blade base and the cross block gate blocks. It is to insure this desirable uniform and adequate lubrication in predetermined variable quantities and at desired intervals that the present invention has been designed and perfected.

The instant oiling mechanism is designed not to exhaust the oil supply in the reservoir within a short period of time as in the instance of the wick type of oiler. According to the instant invention, the oiler is designed to feed the lubricant as a fine spray or as one or more drops, according to the preferred procedure determined by the design and nature of the machine, and insuring continuous uninterrupted feed of lubricant according to either of the said optional methods without fail. The mechanism is designed to feed oil in accordance with the predetermined number of revolutions of the machine and not on a time basis, with the result that regardless of the speed of the machine, the moving parts to be lubricated receive the proper amount of oil at all times. The mechanism of the oiler designed for the Monotype composing machine mold may be adapted by the operator to inject under pressure a spray of oil or as many as four drops at a time at intervals between 80 revolutions and 1600 revolutions. Such adjustment may be conveniently performed without necessitating shutting down the machine. With modifications however, the oiler can be adapted to feed any quantity of oil and at any predetermined number of revolutions.

With such objects in view, as well as other advantages which may be incident to the use of the improvements, the invention consists in the parts and combinations hereinafter set forth and claimed, with the understanding that the several necessary elements constituting the same may be varied in proportions and arrangements without departing from the nature and scope of the invention.

In order to make the invention more clearly understood there are shown in the accompanying drawings, means for carrying the same into practical effect, without limiting the improvements, in their useful applications, to the particular constructions which, for the purpose of explanation, have been made the subject of illustration.

In said drawings,

Fig. 1 is a view in side elevation of a preferred embodiment of the invention illustrated as installed as an automatic oiling mechanism for the composition mold of a Monotype type-casting machine.

Fig. 2 is a similar view partially in vertical section and illustrating the oiling mechanism in a different position.

Fig. 3 is a similar view illustrating the mechanism in a still further advanced position.

Fig. 4 is a plan view of the mechanism substantially as illustrated in Figs. 1, 2 and 3.

Fig. 5 is a detail view in side elevation similar to Fig. 1 but looking from the opposite side of the mechanism.

Fig. 6 is a view in side elevation of the mechanism as viewed from the left in Fig. 5.

Fig. 7 is a horizontal section taken substantially on line 7—7 of Fig. 1.

Fig. 8 is a similar view taken on line 8—8 of Fig. 3.

Fig. 9 is a detail perspective view of one of the elements of the machine.

Fig. 10 is an enlarged view in side elevation of one of the gear elements for actuating the mechanism.

Referring to the drawings, 1 indicates a portion of the bridge of a Monotype casting machine, and 2 indicates a portion of the composition mold which it is desired to lubricate automatically and in desired amounts at predetermined specified intervals in accordance with operating conditions without manual attention. Since both sides of the reciprocating mold are subject to lubrication, the instant device is particularly designed for such purpose. To such end the lubricating mechanism comprises an oil cup 3 including a lower plate or bracket member 4 having transversely aperture vertically extending stud 5 and upper plate member 6 having a cutaway portion or recess 6a which is adapted to be removably clamped and secured by a clamping device 7 to bridge lever fulcrum rod 8 constituting a part of the Monotype bridge. The lower plate member 4 is provided at one end with a substantially semi-circular recess 4a (Fig. 7) which is designed to engage the lower circular portion of a nut member 4b also constituting a standard part of a Monotype type-casting machine. The engagement of the oil cup unit with the parts 4b and 8 of the Monotype machine serves to securely position the latter in proper relation to the mold to be lubricated as well as in relation to the machine mechanism for actuating the lubricating mechanism. The adjustable clamp member 7 is also best illustrated in Fig. 7 and includes a stem 7a having an inner threaded portion 7b for engaging the aperture of the stud 5. The clamp member further includes a hook latch member 7c having a pivotal mounting 7d on a block member 7e also apertured to receive the stem 7a of the clamp. The oil cup 3, lower plate 4, and upper plate 6 and parts carried thereby constitute a unit which is removably secured as above described to the parts 4b and 8 of the machine. The recess 4a is engaged with the nut 4b and the hook lever 7c is swung over to engage the rod 8. The stem 7a is threaded inwardly through the threaded aperture of the stud 5 until the inner end of the former engages the rod 8 and clamps the same securely against the hook portion of the lever 7c. A transverse aperture 7f in the outer portion of the stem 7a may be provided for the insertion of an implement to obtain a tight clamping engagement with the rod 8 and said outer end of the stem may be knurled to provide a convenient hand grip for removably locking the oiler unit in position on the rod 8.

A cylinder member 9 having a central vertical bore 10 is centrally and axially secured to the oil cup member 3 as by means of the lower threaded stud portion 11 engaging corresponding threads of a central recessed portion 12 provided in the base portion 13 of the oil cup member 3. The bore 10 of the cylinder terminates at its lower end in a reduced vertical passage 14 provided in a tubular lower extension 15 of the oil cup member, and a tubular member 16 is fitted or shrunk over a shouldered portion 17 of the oil cup. A lock nut indicated at 18 is threaded over the upper end of the sleeve 16 and maintains the parts in assembled position rigidly supported at one end of the plate member 4. Sight apertures 19 are preferably provided in opposite wall portions of the sleeve 16 to the end that the proper operation of the oiling mechanism may be observed. The lower end of the sleeve member 16 is substantially closed, but is provided with two vertically aligned and parallel oiling ports 20, 20a (see also Fig. 8) separated by a bridge portion or knife edge 21. The aligned ports 20 and 20a communicate respectively with a pair of branch pipes 22, 22a in turn respectively leading to opposite sides of the reciprocating mold 2 to lubricate the latter at predetermined intervals as best seen in Figs. 1 and 2.

The bore 10 of the cylinder member 9 is provided with a vertically slidable or reciprocating piston 23 of substantially solid construction and designed when in its lowermost position as seen in Fig. 2, to seal off and close the upper end of the bore or passage 14 leading to the aforesaid branch pipes 22, 22a. The piston 23 is vertically slotted for a portion of its length as shown at 24, said slot engaging the inner end of a pin 25 radially disposed and having threaded engagement with a suitable recess in the cylinder member 9. This insures against rotation of the piston relative to its cylinder and preserves the desired alignment of the ports to be hereinafter described. The engagement of threaded pin 25 with the opposite vertically disposed ends of the slot 24 also serves to limit movement of the piston in vertical directions. Adjacent its lower end the piston 23 is provided with a diametrically disposed transverse port or passage 23a extending therethrough from side to side thereof.

The cylinder member 9 is provided with horizontally aligned transverse ports 26, 26a, the former communicating at its outer end with the interior of the oil cup 3 and at its inner end with the central bore 10 of the cylinder. The inner end of the port 26a also communicates with said bore and communicates at its outer end with a vertical bore or passage 27 disposed in the cylinder 9 and terminating at its lower end in an inwardly offset passage 28 communicating with the bore 10. The upper end of the vertical passage 27 communicates with the atmosphere and serves as a vent and also an atmospheric pressure inlet. When the piston 23 is in its lowermost position (Fig. 2) its transverse port 23a is in communication with the horizontal aligned ports 26, 26a of the cylinder 9.

As best seen in Fig. 2 when the piston 23 is in its lowermost position, communication is provided for the supply of an increment of lubricant from the cup 3 to the interior of the pressure supply mechanism through the ports 26, 23a and 26a and thence into the vertical port 27 of the cylinder. Oil is trapped in the latter port and is prevented from reaching the central vertical port 14 of the oil cup because the upper end of said latter mentioned port is sealed by the lower end of the piston. When the latter is lifted by mechanism to be described its transverse port 23a is moved out of registration with ports 26, 26a of the cylinder (Fig. 3) thereby preventing the admission of further oil from the cup 3. This sealed communication with the cup continues and further elevation of piston 23 moves the lower end of the latter out of sealing registry with the port 28 and oil which has been trapped in the latter and the port 27 enters the upper end of the passage 14 through port 10 and descends therethrough in readiness to be projected downwardly in the form of one or more drops as desired and against the knife edge 21 to be divided in equal increments passing respectively into the branch pipes 22, 22a and thence to opposite sides of the composition mold 2 in a manner which will be clearly apparent to one skilled in the art. Entrance of air at the upper end of port 27 insures against the oil remaining in the port 28 and failing to enter the port 14. Any tendency of the oil to remain in port 14 is insured against by the downward projection of the piston 23 at the desired interval which results in the oil present in port 14 being forcibly dispelled into the branch pipes 22, 22a and thence to the type casting machine mold 2 to lubricate the latter.

In this downward position of the piston the ports are again in the position illustrated in Fig. 2 and a further increment of oil from cup 3 enters the passages 26, 23a, 26a, 27 and 28 as has been previously described and in readiness to permit further lubrication after the piston has been again lifted and projected downwardly by mechanism which will now be described.

A bracket member or support is indicated generally at 29, its lower end being offset or provided with an outward projection or block member 29a. The outer side of said block member is provided with a vertical aperture 29b (Fig. 5) extending therethrough to permit the bracket support unit 29 to be moved laterally to engage said aperture 29b with the rod member 8 previously described and which comprises a standard unit of a Monotype machine. After such engagement the bracket member and parts carried thereby are firmly locked in position on the rod member 8 by means of a removable suitably apertured cover plate member 29c for the block 29a, said apertured cover being adapted to be loosely fitted over the threaded ends of a pair of pins 29d projecting outwardly from the block member 29a. After the cover plate is assembled a pair of nuts indicated at 29e are screwed tightly home on the threaded pins 29d thereby securely locking the plate or housing member 29 in position on the rod 8. The described locking elements permit the member 29 and gearing carried thereby to be inserted on the machine by a transverse motion, thereby adapting the mechanism for convenient attachment to a Monotype machine without requiring disassembly of the latter or any disturbance of its adjusted parts in the event it should be desirable to remove the oiling unit for any purpose.

An L-shaped bracket member 30 is secured as by screws 31 to the upper end of the bracket member 29, the lower end of the depending portion 32 of said auxiliary bracket member being apertured to constitute a journal for a transverse shaft 33, the outer end of said shaft as viewed in Figs. 1 and 2, being journaled in the bracket member or plate 29, said shaft having a gear or pinion 34 rigidly keyed thereto. A rocker arm 35 having an inner hub portion 35a (Fig. 6) is loosely journaled on the shaft 33 between the bracket members or portions 29 and 32, and a pawl member indicated at 36 is pivotally mounted as at 37 to the outer end of said rocker arm. A coil or tension spring 38 secured at its lower end as at 39 to the bracket 29 and secured at its upper end as at 40 to the pawl member, tends to maintain the inner end of the latter in engagement with the peripheral teeth of a ratchet wheel 41 journaled on the shaft 33 and disposed as illustrated between the rocker arm 35 and the bracket 29. The rocker arm 35 as best seen in Figs. 5 and 6 is further provided with a rearwardly extending bracket support 42 having threaded engagement with a threaded adjusting bolt 43 the rotation of which positions its lower end in predetermined location in respect to the bracket 42 and may be locked in such desired adjusted position as by a lock nut 44. The lower end of the threaded adjusting bolt 43 is designed to be engaged by a bracket or bridge member 45, said bracket member being removably secured and mounted as by a nut 45a to the upper end of one of the carrying frame guide rods 46 (Fig. 5), constituting a standard constantly vertically reciprocating part of the Monotype machine. It will be understood that when the lower end of the bolt 43 is engaged and elevated by the bracket or bridge 45, the rocker arm 35 will be correspondingly elevated against the tension of springs 38, and pawl 36 slips over a predetermined number of ratchet teeth of the gear 41. When the vertically reciprocating members 45 and 46 of the machine move downwardly, the tension of spring 38 pulls the rocker arm 35 downwardly and gear or ratchet 41 is rotated for a partial revolution by the engagement of its teeth by pawl member 36. Downward movement of rocker arm 35 and consequent rotation of ratchet wheel 41 is limited by the engagement of an arm or pin 47, projecting radially from the hub portion 35a of the rocker arm 35, with the horizontal portion 30 of the L-shaped bracket member above described secured to the upper end of supporting plate 29. Retrograde movement of ratchet 41 is prevented by engagement with the teeth thereof by the free end of a spring detent 41a secured to the plate member 29.

The above described intermittent rotation of ratchet wheel 41 produces an equivalent intermittent rotation of gear wheel 34 on the outer end of shaft 33. The teeth of this gear member mesh with the peripheral teeth of an intermediate gear member 49 journaled on an intermediate stud shaft 50 secured in and projecting from the bracket support member 29. The outer end of said stud shaft carries a pinion 51 fast on the gear 49 and having meshing engagement with the peripheral teeth of a lower gear member 52 carried by a suitable stud shaft (not shown) secured to or journaled in the bracket member 29. The gear 52 carries on its outer face a disk-like housing member 53 having a radially and diametrically disposed slot 54 therein. (See also Fig. 10.) A pair of adjusting companion block members 55, 55a are disposed in axial alignment within the diametric slot 54 of the disk, said block members each having an elongated central slot 56 by means of which the said block members are secured to the disk member 53 respectively by screw elements or pins 57. Each block member 55, 55a is further provided with an outwardly extending stud element or pin 58. It will be understood that radial adjustment of the block members 55, 55a by means of the screws 57 and elongated slots 56 move the projections 58 radially outwardly or inwardly as desired with respect to the axis of the disk 53 carried by the lower gear member 52.

From the train of reduction gearing above described, it will be understood that the intermittent reciprocation of ratchet pinion 41 results in a very much reduced relative intermittent speed of rotation of lower gear member 52 carrying the disk 53 and consequently a relatively slow intermittent rotation of the diametrically disposed pins 58 carried by said disk of the lower gear member 52.

An L-shaped lever having a forward arm 59 is pivotally mounted upon a pin or stud 60 secured to bracket member 29, said lever arm being provided with a central aperture or slot 61 constituting a housing for a block member 62 adjustably secured in said slot or recess by means of a screw 63 or other fastening element. The inner end of the block member 62 is cut away on a bias as at 62a (Fig. 9) to provide an abrupt termination 62b of the block member which latter is designed to be successively engaged by the pins 58 to elevate the pivoted lever 59. A rearwardly extending arm 64 of the L-shaped lever 59 is provided with a projecting bracket 65 to which the upper end of a tension spring 66 is secured. The lower end of said spring is in turn secured as at 67 (Fig. 5) to a suitable part of the supporting bracket block 29a. The elevation of the lever 59 successively by the engagement of diametrically disposed pins 58 with the adjustable block member 62, therefore elevates the pivoted lever 59 against the tension of spring 66. A set screw 68 is threaded into the end of the lever arm 59 and bears at its inner end against the block member 62 to lock the same in adjusted position as determined by the screw member 63 which latter engages threaded apertures 63a (Fig. 9) of said block members. One arm 69 of an additional L-shaped lever is provided with aligned elongated slots 70 (Fig. 6) by means of which said latter mentioned lever is adjustably secured to the rearwardly extending arm 64 of lever 59, by means of screws 71 or other fastening elements. An arm or lug extension 72 of lever 59 serves as a pivotal mounting 73 for a depending lever or arm 74. The lower end of the pivotally mounted arm 74 is provided with an offset forwardly projecting part 75 having a slot or recess 76 (Fig. 4) adapted to engage the upper end of a threaded stem 77 in turn having threaded engagement at its lower end as at 78 with the upper end of the piston 23 of the oil cup pressure distributor (Fig. 2). The degree to which the latter piston is elevated by upward movement of arm 74 on pivoted lever 59 is regulated and determined by a pair of lock nuts 79 and 80 threaded on stem 77 and which may be adjusted on said stem to determine the interval when arm 75 of lever 74 engages said lock nut elements to lift the stem 77 and piston 23. The notched or recessed arm 75 of lever 74 is further provided with a reciprocating spring pressed locking device indicated at 81 and best seen in Fig. 4 for removably securing against displacement within the notch 76 the upper end of the threaded stem 77. Said spring pressed locking device is of U-shaped configuration fitting through suitable spaced apertures in the notched or recessed arm 75, the device being normally urged into locking position over stem 77 to confine the latter within the recess 76, by means of a spring 77a bearing at its inner end against the lower end of lever arm 74, and bearing at its outer end against an enlarged head 77b of the U-shaped locking device 81. Referring to Fig. 4, when the spring is compressed by inward pressure on head 77b a portion 77c of the locking device is projected downwardly as viewed in said figure against the tension of the spring to permit the threaded stem 77 to be removed or released from the recess 76. This provides a convenient manner for removably locking the stem 77 in engagement with lever arm 74 during normal operation of the mechanism.

From the foregoing it will be understood that the piston 23 is lifted twice within the central bore 10 of cylinder 9 for each revolution of gear 52, by reason of the successive engagement of pins 58 with the adjustable block member 62 carried within the recessed portion 61 of pivotally mounted lever 59. These successive elevations of the piston 23 continue as a pin member 58 rotates upwardly and inwardly in engagement with block member 62 until it slips off the inner end or knife edge 62b of the block member which is cut on a bias to permit a sharp and instantaneous disengagement. When this occurs the arm 59 descends forcibly due to the tension of spring 66 with the result that lever arm 74 forcibly projects stem 77 downwardly by engagement of portion 75 of said lever arm with an enlarged portion 78a of the stem 77 to project the increment of oil in the passage or port 14 into the respective branch pipes 22, 22a leading to the mold to be lubricated. The speed of rotation of the train of gearing may be determined at will by adjustment of the threaded bolt 43 and the extent of elevation of the lever 59 may also be determined and readily adjusted by means of the respective pin members 58 of the disk 53, and adjustment of the block member 62 within its slot 61 of pivotally mounted lever 59.

The above described adjustments are to compensate for minute irregularities in Monotype machines, and to permit the oiling mechanism to be conveniently installed in operative position without necessitating different oiling mechanism fixtures for each installation where minor differences appear as to standard parts.

In certain installations where it may be necessary to provide automatic oiling at more frequent intervals, it will be understood that the number of pins 58 may be increased in number around the periphery of the disk 53, which would provide for reciprocating the piston 23 within its cylinder 9 at more frequent intervals. For example, the pins may be increased to three or four or more, it being desirable that the same be equidistantly spaced on the disk member 53. Conversely should oiling be required at less frequent intervals, there need be but a single pin 58 arranged for engagement with the pivoted lever 59, in which event the latter would be actuated to reciprocate the piston 23 but once for each revolution of the gear 52. As previously stated the speed of rotation of the latter to reduce or increase the time interval between successive reciprocations of the piston 23, may be quickly determined by rotation of the adjusting stud or bolt 43 in either direction to vary the extent of throw of rocking lever 35 which latter in turn determines the extent of partial revolution of the ratchet wheel 51 due to the engagement of pawl 35 with the closely spaced ratchet teeth of said ratchet member 41.

What I claim is:

1. In an automatic oiling mechanism the combination of a reservoir having a cylinder provided with a bore terminating in a valve seat, and a piston valve in said bore adapted to open and close said valve seat, said cylinder and piston valve having registering apertures therein communicating with said reservoir and with the atmosphere, whereby said valve when in open position seals off admission of lubricant from said reservoir to said bore and permits the feed of admitted lubricant to said valve seat for lubricating purposes, said valve when in closed position admitting lubricant to said apertures in said cylinder while preventing its admission to said bore, and means for opening and closing said valve to forcibly project lubricant in said bore through said valve seat as the latter is closed by said valve.

2. In an automatic oiling mechanism the combination of a reservoir having a cylinder provided with a bore terminating in a passage constituting a valve seat, said cylinder having a port communicating with said bore and said reservoir, a second port in said cylinder communicating at one end with said bore and terminating at its other end in an air vent, said second port also having an auxiliary port communicating with said bore in alignment with said first mentioned port, a piston valve in said bore adapted to close said passage and having a transverse port disposed in registry with said first and second mentioned ports when the valve is in closed position, to permit admission of lubricant from said reservoir to said second mentioned port, said valve when in open position sealing off further admission of lubricant from said reservoir and permitting the feed of said admitted lubricant to said passage for lubricating purposes, and means for actuating said piston valve to feed lubricant from said reservoir at predetermined intervals.

3. In an automatic oiling mechanism the combination of a reservoir having a cylinder provided with a bore terminating in a passage constituting a valve seat, means for removably securing said reservoir to a machine to be lubricated, said cylinder having a port communicating with said bore and said reservoir, a second port in said cylinder communicating at one end with said bore and terminating at its other end in an air vent, said second port also having an auxiliary port communicating with said bore in alignment with said first mentioned port, a piston valve in said bore adapted to close said passage and having a transverse port disposed in registry with said first and second mentioned ports when the valve is in closed position, to permit admission of lubricant from said reservoir to said second mentioned port, said valve when in open position sealing off further admission of lubricant from said reservoir and permitting the feed of said admitted lubricant to said passage for lubricating purposes, and gearing actuated by a moving part of the machine for in turn actuating said piston valve to feed lubricant from said reservoir at predetermined intervals.

4. In an automatic oiling mechanism the combination of a reservoir having a cylinder provided with a bore terminating in a passage constituting a valve seat, means for removably securing said reservoir to a machine to be lubricated, said cylinder having a port communicating with said bore and said reservoir, a second port in said cylinder communicating at one end with said bore and terminating at its other end in an air vent, said second port also having an auxiliary port communicating with said bore in alignment with said first mentioned port, a piston valve in said bore adapted to close said passage and having a transverse port disposed in registry with said first and third mentioned ports when the valve is in closed position, to permit admission of lubricant from said reservoir to said second mentioned port, said valve when in open position sealing off further admission of lubricant from said reservoir and permitting the feed of said admitted lubricant to said passage for lubricating purposes, a train of reduction gearing intermittently actuated by a reciprocating part of the machine for in turn actuating said piston valve to feed successive increments of lubricant from said reservoir at predetermined intervals, and means for regulating the degree of intermittent actuation of said gearing to vary the interval between said successive increments of lubricant.

5. In an automatic oiling mechanism, the combination of a reservoir and a cylinder therein having a wall provided with a bore terminating in a lubricating passage, a piston adapted to reciprocate in said bore relative to said passage, said cylinder wall and piston respectively having apertures therein adapted to register with one another and communicating with said reservoir and with the atmosphere, said piston when in one position sealing off said apertures out of registration and admitting a previously received increment of lubricant from a predetermined portion of the aperture in said cylinder wall to said bore, said piston when in another position registering said apertures to admit lubricant from said reservoir to said predetermined portion of the aperture in said cylinder wall while temporarily preventing its admission therefrom to said bore, and means for periodically reciprocating said piston to project through said passage said admitted lubricant in said bore when the piston moves toward the passage.

WILLIAM J. GRIBBIN.